US007333802B2

United States Patent
Moon

(10) Patent No.: US 7,333,802 B2
(45) Date of Patent: Feb. 19, 2008

(54) INTERNET ACCESS CONTROL METHOD IN A MOBILE COMMUNICATION TERMINAL WITH A BUILT-IN WEB BROWSER

(75) Inventor: Jeong-Kyu Moon, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 766 days.

(21) Appl. No.: 10/008,887

(22) Filed: Nov. 8, 2001

(65) Prior Publication Data

US 2002/0102970 A1    Aug. 1, 2002

(30) Foreign Application Priority Data

Jan. 29, 2001    (KR)    ............... 10-2001-0004112

(51) Int. Cl.
*H04Q 7/22*    (2006.01)
(52) U.S. Cl. ........... 455/414.2; 455/450; 370/347; 709/229
(58) Field of Classification Search ........... 370/308, 370/503, 338, 347; 709/204, 229; 455/414, 455/414.1, 414.2, 414.3, 414.4, 557, 450; 84/609; 713/156; 726/3
See application file for complete search history.

(56) References Cited

U.S. PATENT DOCUMENTS

| | | | | |
|---|---|---|---|---|
| 5,896,369 | A * | 4/1999 | Warsta et al. | 370/338 |
| 5,948,066 | A * | 9/1999 | Whalen et al. | 709/229 |
| 6,321,253 | B1 * | 11/2001 | McKeen et al. | 709/204 |
| 6,519,241 | B1 * | 2/2003 | Theimer | 370/338 |
| 6,529,527 | B1 * | 3/2003 | Chen et al. | 370/503 |
| 6,548,747 | B2 * | 4/2003 | Shibata et al. | 84/609 |
| 6,564,060 | B1 * | 5/2003 | Hoagland | 455/450 |
| 6,763,015 | B1 * | 7/2004 | Phillips et al. | 370/347 |
| 6,834,341 | B1 * | 12/2004 | Bahl et al. | 713/156 |
| 7,185,360 | B1 * | 2/2007 | Anton et al. | 726/3 |

FOREIGN PATENT DOCUMENTS

DE    19845071 A1 *    4/2000

* cited by examiner

*Primary Examiner*—Gerald Gauthier
(74) *Attorney, Agent, or Firm*—The Farrell Law Firm, PC

(57) ABSTRACT

An Internet access control method in a mobile communication terminal with a built-in web browser. Upon receipt of an Internet access request from a user, the mobile communication terminal accesses a web server through an Internet, downloads a web document from the web server, and displays the downloaded web document. Upon receipt of a data input from the user while displaying the web document, the mobile communication terminal performs an operation according to the data input. Otherwise, upon failure to receive any web command from the user for a predetermined time after displaying the web document, the mobile communication terminal temporarily releases an access to the Internet. In the meantime, the mobile communication terminal resumes an access to the Internet upon receipt of a web command from the user.

9 Claims, 4 Drawing Sheets

INTERNET ACCESS CONTROL METHOD IN A MOBILE COMMUNICATION TERMINAL WITH A BUILT-IN WEB BROWSER

PRIORITY

This application claims priority to an application entitled "Internet Access Control Method in a Mobile Communication Terminal with a Built-In Web Browser" filed in the Korean Industrial Property Office on Jan. 29, 2001 and assigned Ser. No. 2001-4112, the contents of which are hereby incorporated by reference.

BACKGROUND OF THE INVENTION

1. Field of the Invention

The present invention relates generally to a mobile communication terminal, and in particular, to an Internet access control method in a mobile communication terminal with a built-in web browser.

2. Description of the Related Art

Recently, a mobile communication terminal has developed into a multimedia device, which can provide not only existing voice call service but also various additional services including an electronic diary, game functions and schedule management functions. A mobile communication terminal supporting a radio data communication service is a typical example of such a multimedia device. The "radio data communication service" refers to a service capable of wirelessly transmitting/receiving text and image data through the mobile communication terminal. By using this service, the terminal user can search, for example, traffic information and stock information. Further, a mobile communication terminal equipped with a web browser can provide an Internet search service as well. Thanks to the radio (or mobile) Internet function, the mobile communication terminal can also provide various additional services, which were conventionally available only in a desktop computer connected to the Internet by wire. At present, an increasing number of mobile subscribers enjoy an Internet access service using the radio Internet function of the mobile communication terminal.

FIG. 1 illustrates an Internet access procedure in a conventional mobile communication terminal in which a web browser is installed to support an Internet search service.

Referring to FIG. 1, in order to access the Internet using the mobile communication terminal, the terminal user first runs the web browser installed in the mobile communication terminal and then requests Internet access by inputting a URL (Uniform Resource Locator) of a web server that he or she desires to access. The mobile communication terminal then receives the user input URL of the web server in step 100, and accesses the Internet through a base station transceiver (BTS), a base station controller (BSC) and a mobile switching center (MSC) in step 102. The base station controller and the mobile switching center connect an Internet access call, requested as a data service option by the mobile communication terminal, to an interworking function system (IWF) and perform data transmission protocol, thereby enabling radio data communication between the web server and the mobile communication terminal through the Internet.

The mobile communication terminal downloads a web document (or web page) from the web server in step 104, displays the downloaded web document on its display in step 106, and awaits user input data in step 108. In this state, the user may read the displayed web document, input another URL, click a hyperlink on the web document to move to a URL indicated by the hyperlink, refresh the displayed web document, or end the Internet access. If the user issues a web command by inputting another URL, clicking a hyperlink on the web document or refreshing the web document in step 108, the mobile communication terminal receives the web command in step 110 and then returns to step 104 to repeatedly perform its succeeding steps 104-108. In the meantime, upon receipt of an Internet access end request from the user in step 108, the mobile communication terminal perceives the Internet access end request in step 112 and proceeds to step 114 to release the Internet access. Otherwise, upon failure to receive any web command from the user in step 108, the mobile communication terminal returns from step 112 to step 108, and continues to await the user input data while maintaining the Internet access.

In most cases, it takes a longer period of time to display a web document and for the user to read the displayed web document rather than downloading the web document. In accomplishing the above, the conventional mobile communication terminal maintains the Internet access even when there is no web command input from the user for a predetermined time after the Internet access has been established, thereby causing an increase in the service charge. Additionally, the mobile communication terminal cannot receive an incoming call while maintaining the Internet access. Maintaining the Internet access for a long time will increase the power consumption, causing a decrease in battery run time of the mobile communication terminal.

SUMMARY OF THE INVENTION

It is, therefore, an object of the present invention to provide an Internet access control method capable of preventing power consumption due to unnecessary maintenance of Internet access in a mobile communication terminal with a built-in web browser.

It is another object of the present invention to provide an Internet access control method capable of reducing a time for which an incoming call cannot be received due to the Internet access in a mobile communication terminal with a built-in web browser.

It is further another object of the present invention to provide an Internet access control method capable of reducing an unnecessary Internet access time in a mobile communication terminal with a built-in web browser.

To achieve the above and other objects, there is provided an Internet access control method in a mobile communication terminal with a built-in web browser. Upon receipt of an Internet access request from a user, the mobile communication terminal accesses a web server through the Internet, downloads a web document from the web server, and displays the downloaded web document. Upon receipt of a data input, or web command, from the user while displaying the web document, the mobile communication terminal performs an operation according to the data input. Otherwise, upon failure to receive any web command from the user for a predetermined time after displaying the web document, the mobile communication terminal temporarily releases an access to the Internet. In the meantime, the mobile communication terminal resumes an access to the Internet upon receipt of a web command from the user.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
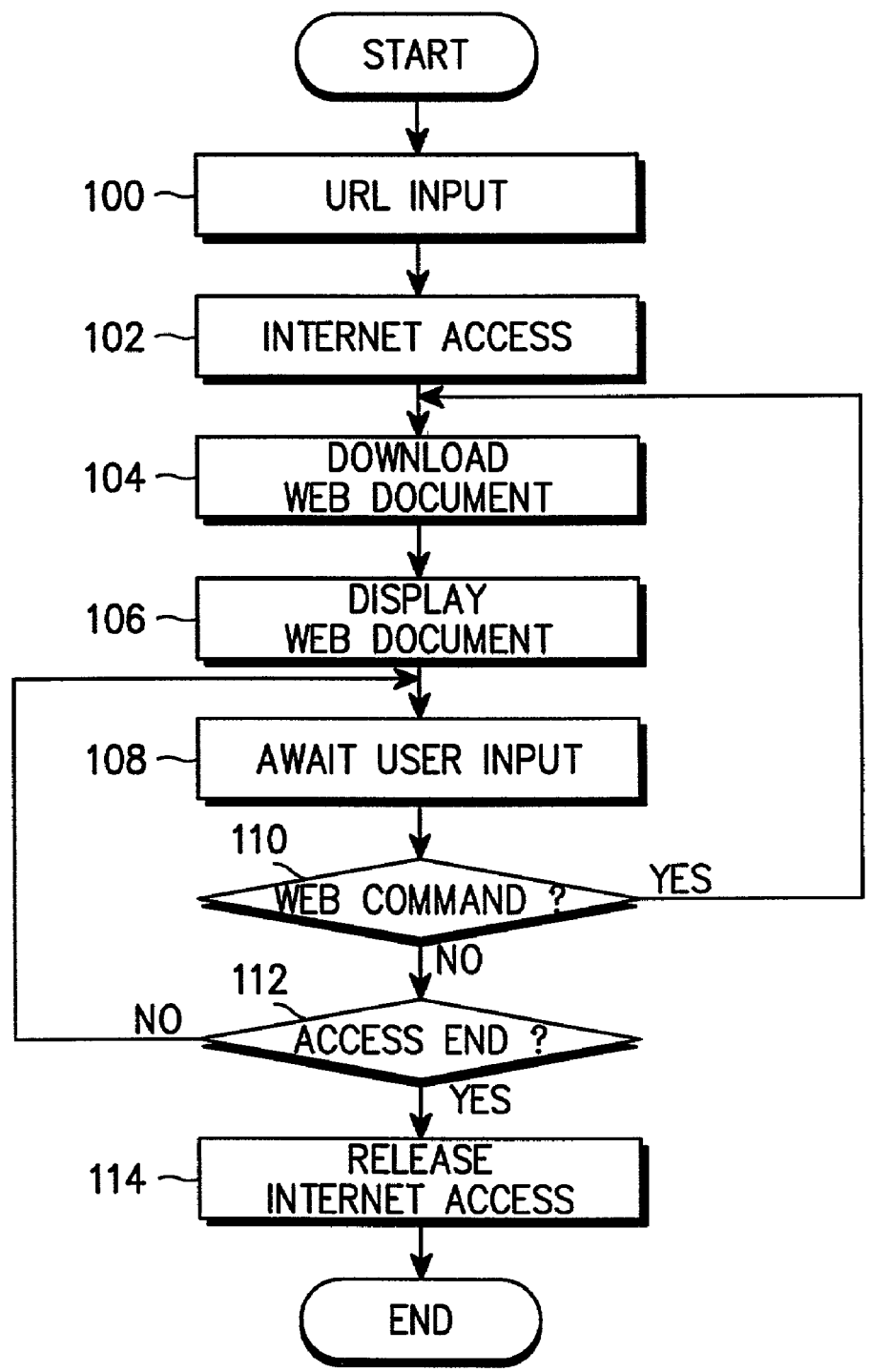
FIG. 1 is a flow chart illustrating an Internet access procedure in a conventional mobile communication terminal.
Figure 2:
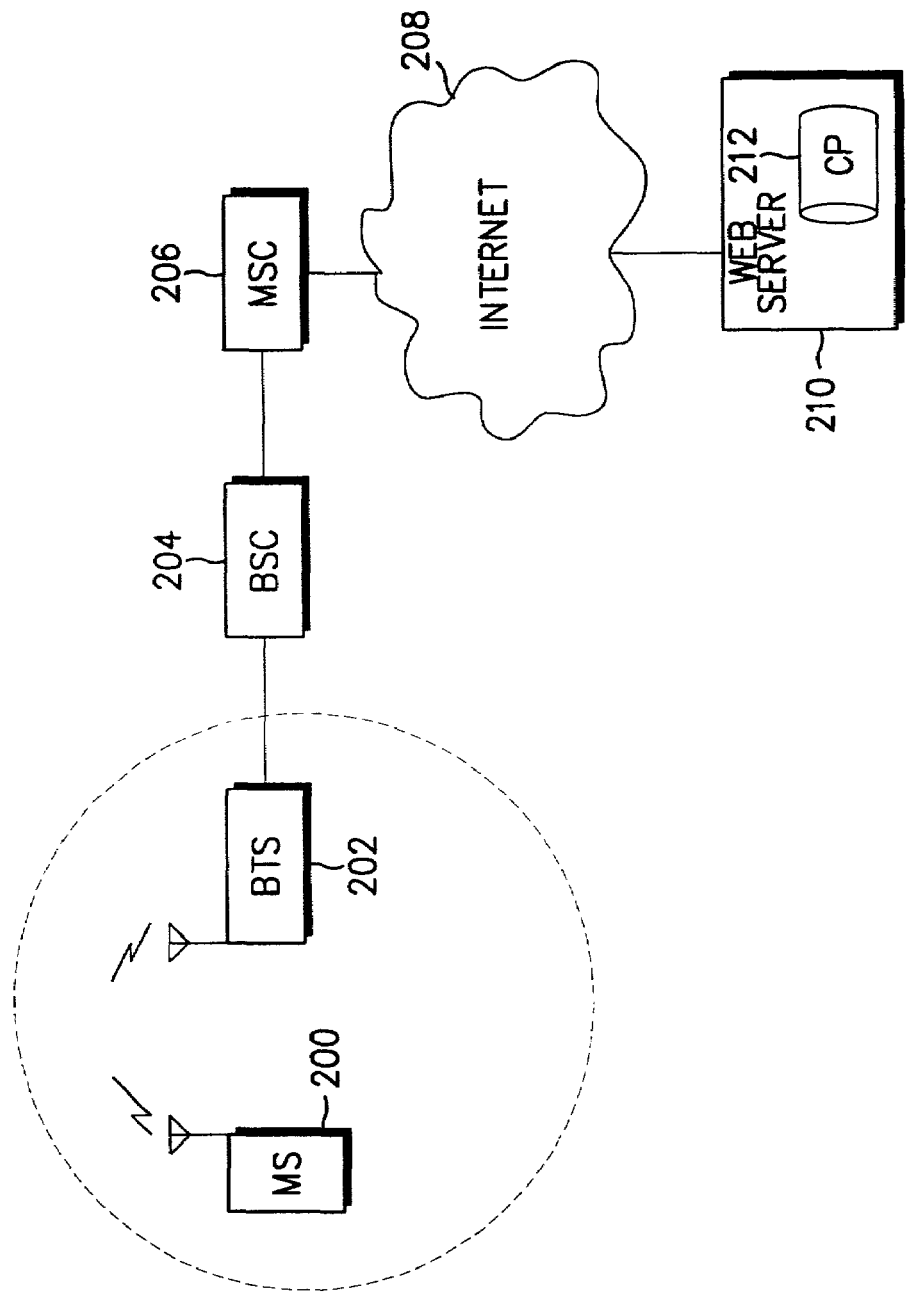
FIG. 2 is a diagram illustrating a mobile communication system to which the present invention is applied.

FIG. 2 illustrates a mobile communication system to which the present invention is applied. The system supports a radio Internet service between a mobile communication terminal and an Internet.

Referring to FIG. 2, a mobile communication terminal (or a mobile station (MS)) 200 has a built-in web browser for Internet access and is provided with TAF (Terminal Adaptor Function) which is a data service communication protocol function. Further, the mobile communication terminal 200 accesses a web server 210 connected to an Internet 208 through a mobile switching center (MSC) 206 to exchange radio Internet data with the web server 210, by supporting a radio data transmission/reception protocol in association with an interworking function system (IWF) of a base station controller (BSC) 204. A base transceiver station (BTS) 202 receives a radio call connection signal from the mobile communication terminal 200 existing in its service area (or coverage) and sends the received signal to the base station controller 204.

The base station controller 204 and the mobile switching center 206 connect a call, requested as a data service option, to the interworking function system (IWF) and perform a data transmission protocol for data transmission of the mobile communication terminal 200, thereby enabling radio data communication between the web server 210 and the mobile communication terminal 200 via the Internet 208. The web server 210, as an Internet service provider, includes a content provider (CP) 212 for providing various content, and provides corresponding content upon receipt of an information request from a user via the Internet 208.

Figure 3:
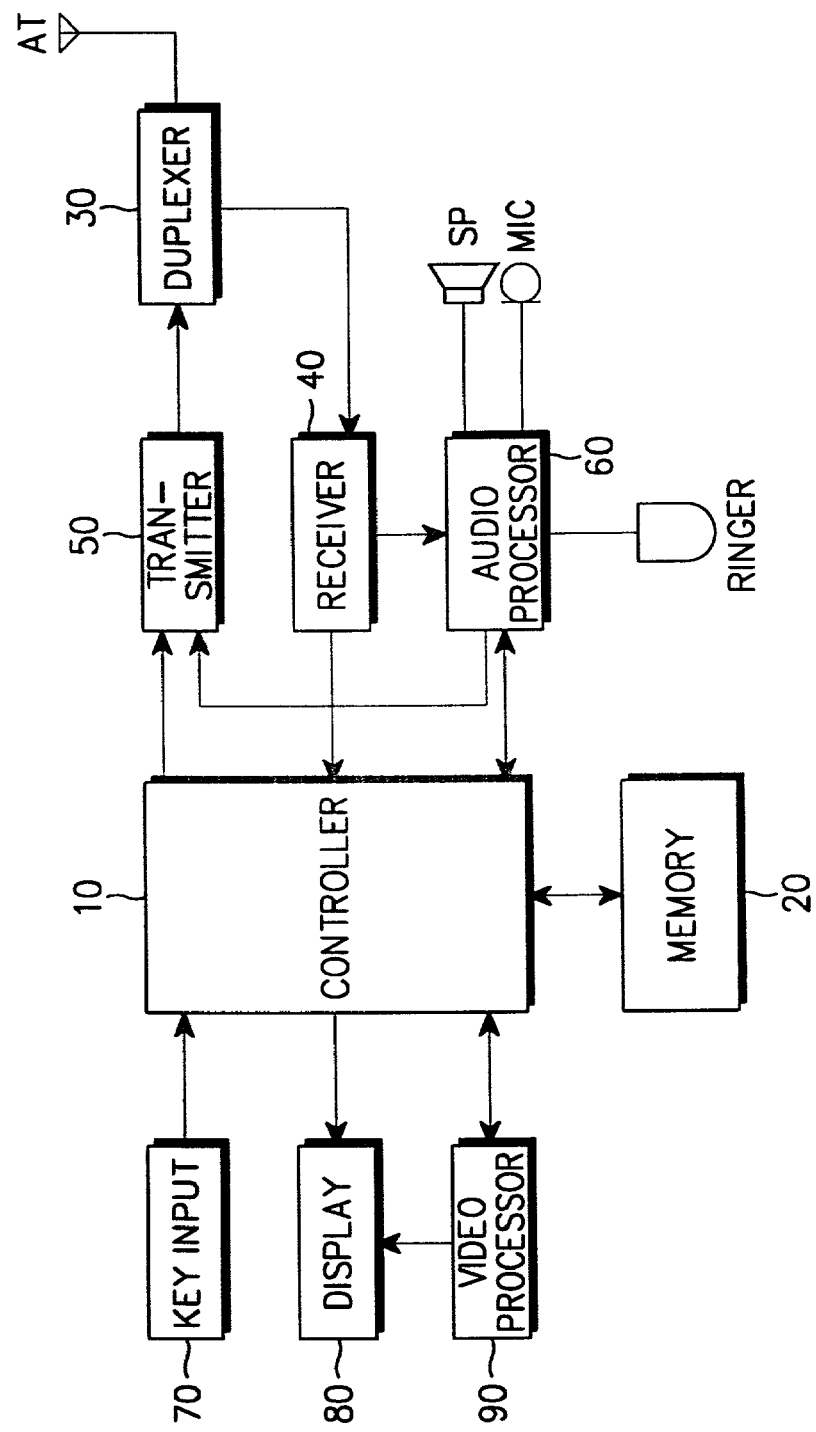
FIG. 3 is a block diagram illustrating a mobile communication terminal to which the present invention is applied.

FIG. 3 illustrates a block diagram of the mobile communication terminal 200 in FIG. 2, to which the present invention is applied. The mobile communication terminal 200 is equipped with a web browser for radio Internet access.

Referring to FIG. 3, a controller 10 controls the overall operation of the mobile communication terminal 200, and in particular, controls Internet access and data transmission/reception operations of the mobile communication terminal 200 according to an embodiment of the present invention. A memory 20 stores a control program of the mobile communication terminal 200 and also stores input/output data during an operation of the mobile communication terminal 200 under the control of the controller 10. Further, the memory 20 stores a web document transmitted from the web server 210 in a predetermined area according to an embodiment of the present invention.

A duplexer 30 communicates with the base station transceiver subsystem 202 through an antenna AT, and separates transmission signals from reception signals. A receiver 40 receives a radio signal through the antenna AT and the duplexer 30 under the control of the controller 10. A transmitter 50 transmits an output signal of an audio processor 60 through the duplexer 30 and the antenna AT. The audio processor 60, under the control of the controller 10, modulates an audio (or voice) signal input through a microphone MIC and provides the modulated audio signal to the transmitter 50. Further, the audio processor 60 demodulates a signal received through the receiver 40 and outputs the demodulated signal to a speaker SP as an audio signal. In addition, the audio processor 60 generates a ring tone using a ringer connected thereto, upon receipt of an incoming call from the base station transceiver subsystem 202. A key input section 70 including a plurality of alphanumeric keys, generates key data according to a key pressed by the user and provides the generated key data to the controller 10. A display 80, under the control of the controller 10, displays various information of the mobile communication terminal 200 and also displays key data generated from the key input section 70 and various information signals from the controller 10. A video processor 90 could be implemented by software and is a web browser application for displaying a web document downloaded on the display 80 after the mobile communication terminal 200 is connected to the Internet.

Figure 4:
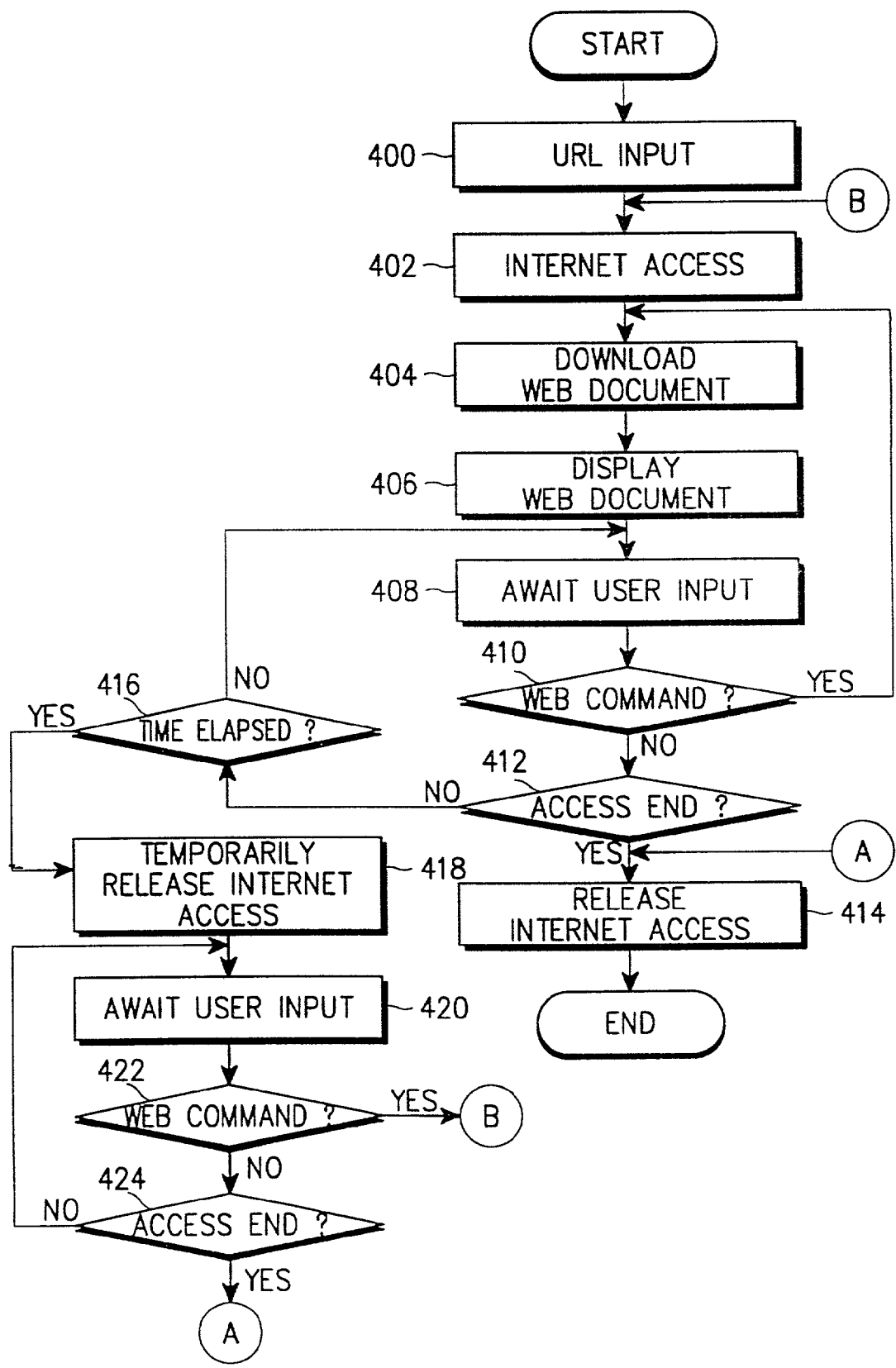
FIG. 4 is a flow chart illustrating an Internet access procedure in a mobile communication terminal according to an embodiment of the present invention.

FIG. 4 illustrates an Internet access procedure performed in the mobile communication terminal 200 equipped with a web browser for Internet access according to an embodiment of the present invention.

Now, a detailed description of the invention will be made with reference to FIGS. 2 and 4. To access the Internet 208 using the mobile communication terminal 200, the terminal user first runs the web browser built in the mobile communication terminal 200 and then requests Internet access by inputting a URL of the web server 210. The controller 10 then receives the URL of the web server 210 from the user in step 400, and accesses the Internet 208 via the base transceiver station subsystem 202, the base station controller 204 and the mobile switching center 206 in step 402. At this point, the base station controller 204 and the mobile switching center 206 connect a call, requested as a data service option by the mobile communication terminal 200, to the interworking function system (IWF), and perform a data transmission protocol for data transmission of the mobile communication terminal 200, thereby enabling radio data communication between the web server 210 and the mobile communication terminal 200 via the Internet 208.

The controller 10 then downloads a web document from the web server 210 in step 404. Subsequently, the controller 10 displays the downloaded web document on the display 80 in step 406, and awaits user input data in step 408. After reading the displayed web document, the user may input another URL, click a hyperlink on the web document to move to another URL indicated by the hyperlink, refresh the current web document, or input an Internet access end key. If the user issues a web command by inputting another URL, clicking a hyperlink on the web document or refreshing the current web document in step 408, the controller 10 receives the web command in step 410 and then returns to step 404 to repeatedly perform its succeeding steps 404-408. Otherwise, upon receipt of an Internet access end request from the user in step 408, the controller 10 perceives the Internet access end request in step 412 and then proceeds to step 414 to release the Internet access. However, upon failure to receive any web command from the user in step 408, the controller 10 proceeds from step 412 to step 416 and determines whether a predetermined web command input wait time has elapsed. The "web command input wait time" refers to a reference time previously determined by the user to release automatically the Internet access upon failure to receive any web command from the user.

If the web command input wait time has not elapsed, the controller 10 returns to step 408 and continues to await the user input data while maintaining the Internet access. Otherwise, if the web command input wait time has elapsed in step 416, the controller 10 proceeds to step 418 and temporarily releases the Internet access after displaying the web document, until the user inputs another URL, clicks a hyperlink on the displayed web document or refreshes the web document. In this state, the mobile subscriber can receive an incoming call even while reading the web document. The controller 10 displays the web document on the display 80 continuously though the Internet access is released in step 418 and awaits user input data in step 420. The user can search the web document displayed on the display 80 using a function such as a scroll function.

Upon receipt of a web command from the user in step 422, the controller 10 returns to step 402 and then resumes an access to the Internet 208. To sum up, when there is no input from the user for a predetermined time after the Internet access has been established, the controller 10 temporarily releases the Internet access and thereafter, resumes the Internet access upon receipt of a web command from the user. In addition, if the user inputs an Internet access end request in step 420, the controller 10 detects the Internet access end request in step 424 and then proceeds to step 414 to release the Internet access.

As described above, the novel mobile communication terminal according to the present invention automatically temporarily releases an access to the Internet if the user inputs no web command for a predetermined time while reading the displayed web document. Thereafter, the mobile communication terminal resumes the Internet access only when it is necessary to download another web document at the user's request, thus reducing the service charge.

The reduction in an Internet access time causes a decrease in power consumption, thereby making it possible to extend the battery run time of the mobile communication terminal. Furthermore, the user can receive an incoming call while reading the web document. Besides, since the mobile communication terminal releases the Internet access not immediately but after a lapse of a predetermined time after displaying the web document, a wait time required in re-accessing the Internet is not affected when the user immediately inputs a web command to download another web document.

While the invention has been shown and described with reference to a certain preferred embodiment thereof it will be understood by those skilled in the art that various changes in form and details may be made therein without departing from the spirit and scope of the invention as defined by the appended claims.

What is claimed is:

1. A network access control method in a mobile communication terminal with a built-in web browser, the mobile terminal having a controller and a display unit, the method comprising the steps of:
    (a) upon receipt of an access request from a user, accessing a web server through a network;
    (b) displaying a web document from the web server;
    (c) upon receipt of an operation command from the user, while displaying the web document, performing an operation according to the operation command;
    (d) temporarily releasing access to the web server, upon failure to receive any web related operation command from the user within a predetermined time after displaying the web document on the display unit of the mobile terminal; and
    (e) reaccessing the web server if there is any web related operation command from the user when the access to the web server has been temporarily released while displaying the web document.

2. The method as claimed in claim 1, wherein step (d) comprises the steps of:
    determining if the web related operation command has been entered by the user;
    determining whether the predetermined time has elapsed; and
    upon failure to receive the web related operation command from the user before lapse of the predetermined time, releasing the access to the web server to enable the mobile communication terminal to receive an incoming call.

3. The method as claimed in claim 1, wherein step (c) comprises the steps of:
    upon receipt of the web related operation command from the user, repeating step (a); and
    upon receipt of an access end request from the user, releasing an access to the web server.

4. The method as claimed in claim 1, further comprising the step of releasing an access to the web server upon receipt of an access end request from the user in step (d).

5. The method as claimed in claim 1, wherein the predetermined time is set by the user.

6. The method as claimed in claim 1, wherein the web related operation command is issued when the user inputs a URL (Uniform Resource Locator), clicks a hyperlink on the displayed web document, or refreshes a displayed web document.

7. The method as claimed in claim 1, wherein the network is the Internet.

8. A network access control method in a mobile communication terminal, the terminal including a controller, a memory, an input and a display means, an audio and a video processor, a signal transmitter, a receiver and a duplexer, and having a built-in web browser, the method comprising the steps of:
    (a) establishing a network access when a user command requesting establishment of the network access is received;
    (b) performing a plurality of operations when a user command corresponding to one of a plurality of operations is received;
    (c) determining if at least one user command requesting performance of any of a plurality of web related operations were input within a predetermined time after a predetermined action;
    (d) temporarily terminating the network access if the determination is negative; and
    (e) reaccessing the network if there is any web related operation command from the user when access to a web server has been temporarily released while displaying a web document.

9. The method as claimed in claim 8, wherein the network is the Internet.

* * * * *